United States Patent
Wadkins

(10) Patent No.: US 6,948,515 B2
(45) Date of Patent: Sep. 27, 2005

(54) CARBON RUPTURE DISK ASSEMBLY

(75) Inventor: Thomas J. Wadkins, Hiram, OH (US)

(73) Assignee: Zook Enterprises, LLC, Chagrin Falls, OH (US)

( * ) Notice: Subject to any disclaimer, the term of this patent is extended or adjusted under 35 U.S.C. 154(b) by 31 days.

(21) Appl. No.: 10/417,898

(22) Filed: Apr. 17, 2003

(65) Prior Publication Data

US 2004/0025936 A1 Feb. 12, 2004

Related U.S. Application Data

(63) Continuation-in-part of application No. 09/612,145, filed on Jul. 7, 2000, now abandoned.

(51) Int. Cl.[7] .............................................. F16K 17/40
(52) U.S. Cl. ..................... 137/68.23; 137/269; 137/910; 137/68.28; 220/89.2
(58) Field of Search ........................... 137/68.19, 68.22, 137/68.23, 68.28, 269, 910; 220/89.2

(56) References Cited

U.S. PATENT DOCUMENTS

| | | | |
|---|---|---|---|
| 2,922,544 A | | 1/1960 | Hibbard et al. |
| 2,952,383 A | | 9/1960 | Paxton et al. |
| 3,109,555 A | * | 11/1963 | Walter ........................ 220/89.4 |
| 3,693,691 A | * | 9/1972 | Summers ..................... 152/427 |
| 4,102,469 A | | 7/1978 | Shegrud et al. |
| 4,315,575 A | * | 2/1982 | Schwarz et al. ........... 220/89.2 |
| 4,479,587 A | | 10/1984 | Mundt et al. |
| 4,631,200 A | | 12/1986 | Bierschenk |
| 4,809,729 A | | 3/1989 | Muddiman |
| 4,937,019 A | | 6/1990 | Scott |
| 5,012,945 A | | 5/1991 | Keenan |
| 5,063,958 A | * | 11/1991 | Wisneskie et al. ....... 137/68.27 |
| 5,121,847 A | | 6/1992 | Ellis |
| 5,313,194 A | | 5/1994 | Varos |
| 5,583,490 A | | 12/1996 | Santos et al. |
| 5,750,058 A | | 5/1998 | Hecht et al. |
| 5,934,308 A | | 8/1999 | Farwell |
| 5,979,477 A | | 11/1999 | Stillings |
| 6,109,042 A | * | 8/2000 | Woods et al. ................. 62/51.1 |
| 6,254,982 B1 | | 7/2001 | Clark |
| 6,311,715 B1 | * | 11/2001 | Wadkins ................... 137/68.23 |

FOREIGN PATENT DOCUMENTS

| | | |
|---|---|---|
| GB | 909379 | 10/1962 |
| GB | 1338747 | 11/1973 |
| GB | 2307654 | 11/1999 |

OTHER PUBLICATIONS 1 page, UCAR Grpahite Anode Processing Flow Sheet, date unknown.

* cited by examiner

Primary Examiner—Ramesh Krishnamurthy
(74) Attorney, Agent, or Firm—Watts Hoffmann Co., LPA

(57) ABSTRACT

A rupture disk assembly for use in a pressurized fluid passageway within an application environment having a temperature operational range. The disk assembly includes a cylindrical one-piece disk consisting of unimpregnated graphite, a single bore extending partway into the top surface of the disk, a casing, and a metallic layer overlaying the planar bottom surface of the disk. The disk assembly has a particular burst pressure that is generally temperature insensitive over essentially the entire temperature operational range. The temperature operational range may be from about −425° F. to about 900° F. The burst pressure may have a tolerance of about +/−5% over the temperature operational range.

9 Claims, 5 Drawing Sheets

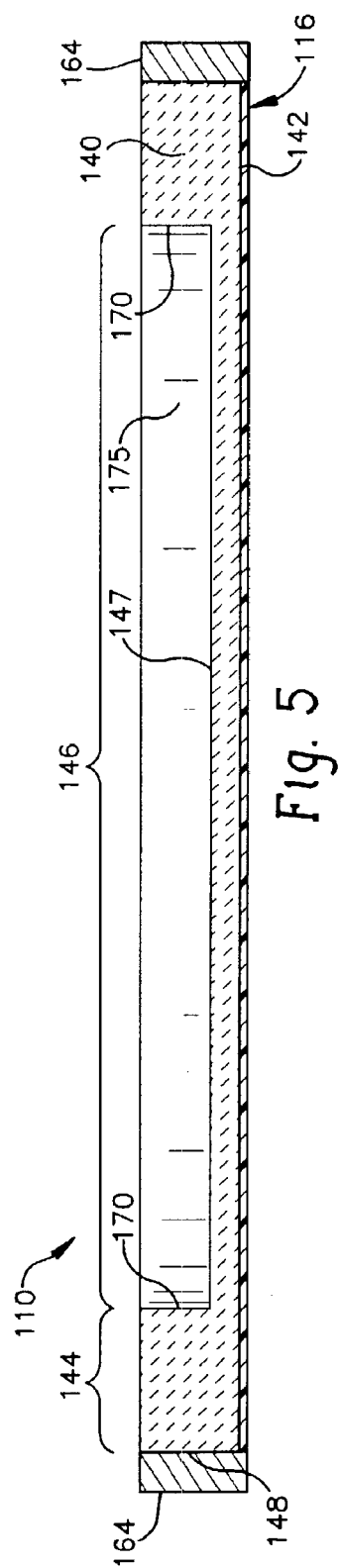
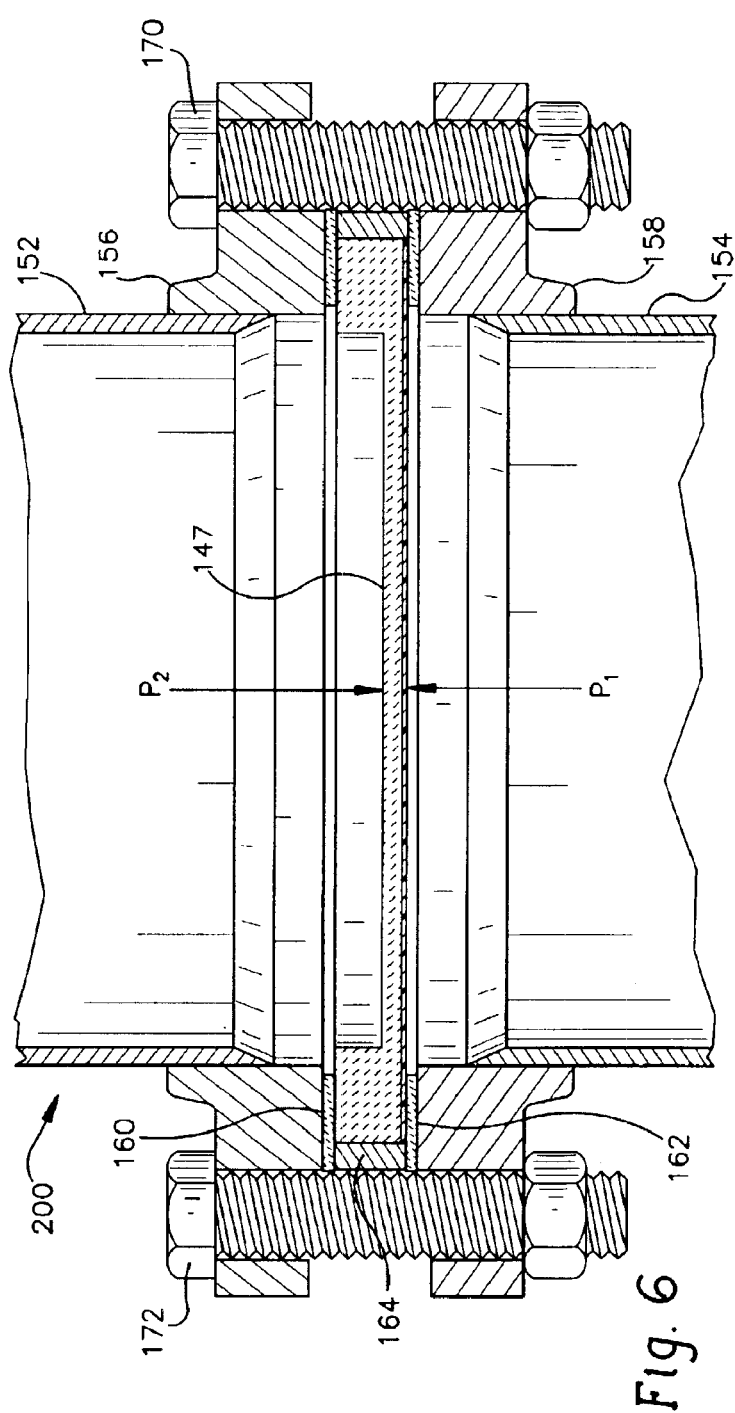
Fig. 5
Fig. 6

CARBON RUPTURE DISK ASSEMBLY

CROSS-REFERENCE TO RELATED APPLICATIONS

This application is a continuation-in-part of U.S. patent application Ser. No. 09/612,145 entitled "Carbon Rupture Disk Assembly" and filed on Jul. 7, 2000 now abandoned. The parent application Ser. No. 09/612,145 is incorporated herein in its entirety by reference.

FIELD OF THE INVENTION

The present invention relates generally to rupture disk assemblies. More particularly, the invention is directed to rupture disk assemblies having a graphite rupturable disk.

BACKGROUND OF THE INVENTION

Rupture disks are commonly used in industry as safety devices. A rupture disk is normally mounted in a pressure or vacuum relief conduit extending from a containment vessel. Based on the expected operating pressure and the recommended pressure limits of the vessel, the rupture disk is chosen with an appropriate burst pressure rating. If the pressure differential on the rupture disk exceeds the burst pressure rating, the disk will burst and allow the pressure within the vessel to be relieved, thereby, avoiding catastrophic failure.

Rupture disks are made from a variety of materials including metals, plastics, carbon or the like. Carbon rupture disks are generally preferred since these disks are generally chemically insensitive, generally do not exhibit fatigue failures as a result of pressure variation and typically reliably fail at their predetermined rupture pressure ratings.

Carbon rupture disk assemblies are generally made in one of two ways. The first type comprises a monoblock disk of carbon or graphite of a size that can be bolted directly between pipe flanges or the like. A central bore is machined part way into the disk to define the rupturable area. Thus, the central portion of the disk will burst if the pressure exceeds the predetermined burst pressure defined by the thickness of the rupturable area of the disk.

The second type of carbon rupture disk assembly includes a replaceable rupture disk. At least one bore is machined through the monoblock disk of carbon or graphite. An annular recess is machined about the bore to a depth less than the axial thickness of the monoblock disk. The replaceable rupture disk is fastened in the annular recess and the entire assembly is bolted directly between two pipe flanges or the like such that the rupture disk within the assembly will burst once the pressure from the containment vessel exceeds the predetermined burst pressure rating. A replacement rupture disk can be used without replacing the entire assembly.

Carbon, by itself, is a porous, brittle material and is therefore impregnated with a resin for use as a rupture disk to make the rupture disk generally impermeable and gas tight. Typically, phenolic resins are used to impregnate the porous graphite material using methods generally known to those skilled in the art.

One problem with the use of carbon rupture disks impregnated with resin in either type of assembly is that the resin materials are sensitive to temperature and chemical corrosion. Carbon, by itself, is thermally stable up to about 3000° C. The resin materials typically used to impregnate the carbon rupture disks may degrade at elevated operating temperatures thereby effecting the integrity of the rupture disk. At the lower temperatures, the use of carbon rupture disks impregnated with resin material may increase the burst pressure rating of the disk rated at higher temperatures. That is, the rupture disk will not rupture when exposed to a pressure that exceeds the pressure rating, thereby potentially causing failure. Likewise, exposure of the resin impregnated disk to certain corrosive chemicals has been found to compromise the integrity of the rupture disk. In addition, the process of impregnating disks with resin effects and introduces variability to the burst pressure rating.

Temperature Range Discussion

More specifically, most rupture disks are designed and marketed to have a certain burst pressure rating at a given temperature. In applications having this rated temperature, disks are expected to burst at the pressure designated within plus or minus 5% psi. However, conventional rupture disk assemblies cannot be successfully used in application environments having a wide temperature range. For example, rupture disks constructed of stainless steel weaken at elevated temperatures, thereby decreasing the burst pressure. Conversely, at decreased temperatures the stainless steel material actually strengthens and the burst pressure increases. The effects are not minimal and actually can be quite substantial. A stainless steel disk designed to rupture at 100 psi at 72° F. (22° C.) will rupture at as much as approximately 200 psi at −425° F. (−254° C.) and as low as 74 psi at 900° F. (482° C.). The effects of a wide temperature range on disks constructed of impregnated graphite are similar. A disk constructed of impregnated graphite designed to rupture at 100 psi at 72° F. (22° C.) will rupture at as much as approximately −120 psi at 425° F. (−254° C.) and as low as 75 psi at 430° F. (221° C.). These burst values are based on published temperature correction tables available to and known to those with ordinary skill in the art. Further, conventional impregnated disks reach their conventional temperature operational limit at 430° F. (221° C.) and therefore cannot be used at higher temperatures.

The applicant is not aware of any conventional rupture disk known in the art that maintains a plus or minus 5% accuracy of a burst rating over a wide range of temperatures, such as the above-discussed range of about −425° F. (−254° C.) to about 900° F. (482° C.). Nor is the applicant aware of any conventional rupture disk known in the art that seeks to solve the need of a rupture disk featuring a tight burst tolerance over a wide temperature range with the combination of elements of the present invention.

Accordingly, there is a need for an improved carbon rupture disk assembly adaptable for use in applications with a wide range of elevated and decreased temperatures that offers a tight burst pressure tolerance over the application temperature range.

SUMMARY OF THE INVENTION

The present invention is directed to a new and improved carbon rupture disk assembly featuring a tight burst pressure tolerance within application environments having wide temperature operational ranges.

In a preferred embodiment, a rupture disk assembly includes a cylindrical one-piece disk consisting essentially of unimpregnated graphite having a top surface and a planar bottom surface, wherein the bottom surface faces a pressurized source, a single bore extending partway into the top surface of the disk forming an integral rupturable portion and an annular support portion wherein an axial thickness of the integral rupturable portion is less than an axial thickness of the annular support portion, a casing circumferentially disposed about the disk, and a metallic layer overlying the planar bottom surface of the disk. The disk assembly has a particular burst pressure that is generally temperature insensitive over essentially the entire temperature operational range.

The burst pressure is generally temperature insensitive over the temperature operational range, wherein the range may be from about −425° F. to about 900° F.

The burst pressure may have a tolerance of about +/−5% over essentially the entire the temperature operational range.

The burst pressure may have a tolerance of about +/−5% over essentially the entire the temperature operational range, wherein the range is from about −425° F. to about 900° F.

A bottom limit of the temperature operational range may be about −390° F. and a top limit of the range may be about 1000° F. Further, a top limit of the range may be at least as high as 5432° F.

The layer may be a metal selected from the group consisting of nickel, monel, inconel, tantalum, steel and hastelloy. The layer may be generally temperature insensitive below about 1000° F.

The casing may be a section of metal pipe.

Other objects and advantages and a fuller understanding of the invention will become apparent to those with ordinary skill in the art from the following detailed description of the preferred embodiments and the accompanying drawings.

BRIEF DESCRIPTION OF THE DRAWINGS

FIG. 5 is a cross-sectional view of a carbon disk assembly in accordance with yet another alternative embodiment of the invention; and FIG. 6 is a cross-sectional view of the carbon disk assembly of FIG. 5 illustrated in a typical installation.

DETAILED DESCRIPTION OF THE PREFERRED EMBODIMENTS

The inventive rupture disk assembly eliminates the need to impregnate the carbon rupturable portion of the disk assembly with resin and thus, overcomes the problems associated with the prior art. The rupturable disk portion so formed, consists essentially of carbon or graphite. The integrity and reliability of the rupture disk assembly is maintained for a variety of in-use conditions, including but not limited to, elevated temperatures and corrosive chemical environments. Moreover, the use of essentially one material, carbon or graphite, for the rupturable portion of the disk assembly results in improved reliability for the different conditions and rupturable disks with tighter tolerances for burst pressure ratings.

Figure 1:
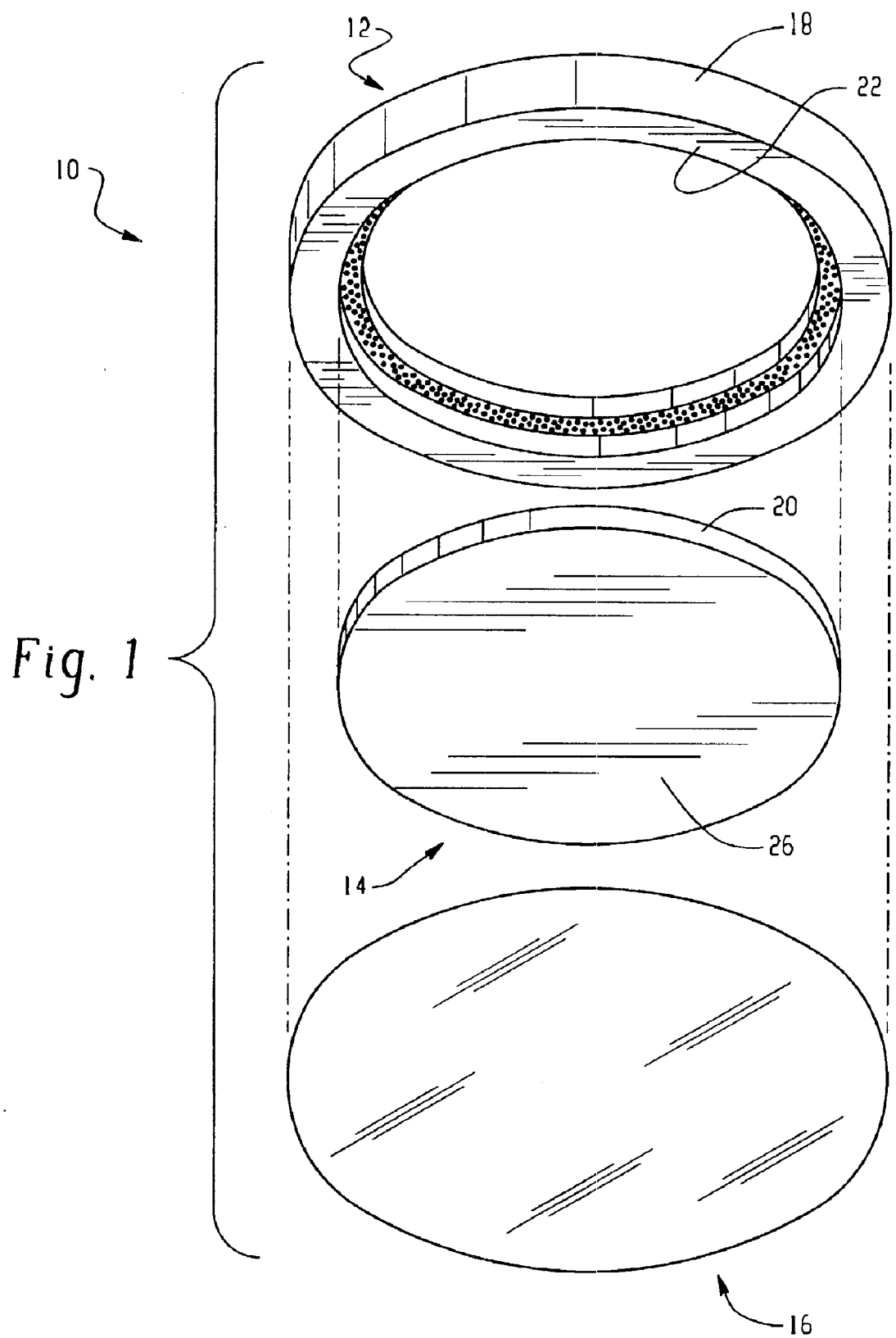
FIG. 1 is an exploded perspective view of a carbon rupture disk assembly in accordance with one embodiment of the present invention.
Figure 2:
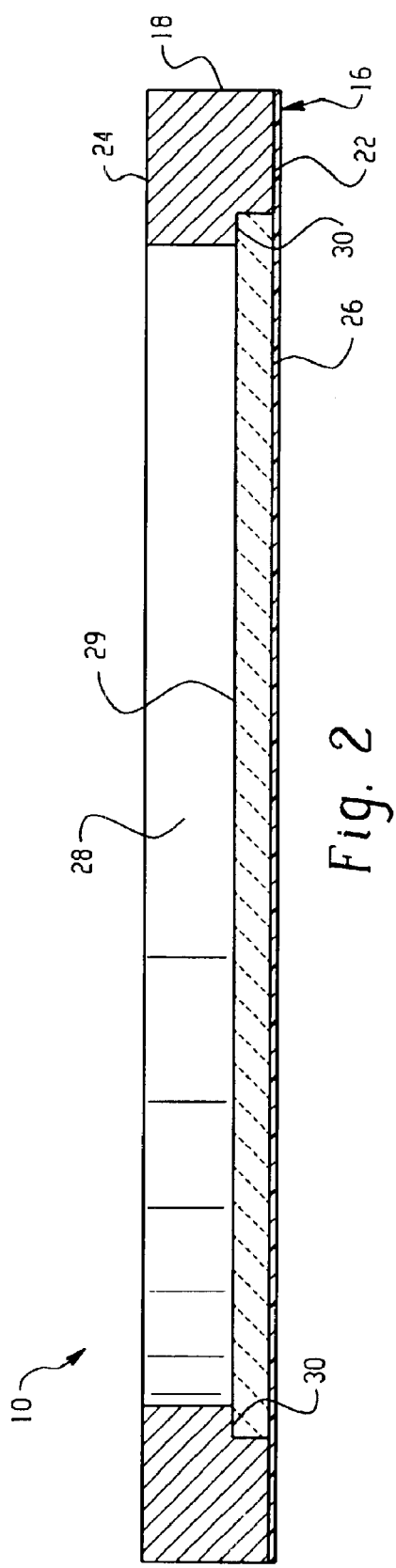
FIG. 2 is a cross-sectional view of the carbon disk assembly shown in FIG. 1.

Turning now to the drawings and to FIGS. 1 and 2 in particular, the illustrated pressure relief rupture disk assembly is generally designated by reference numeral 10. The inventive rupture disk assembly generally includes an annular support portion 12, a pressure sensitive rupture disk 14 and an impervious layer 16. The annular support portion of the disk assembly forms an annular base with an outer peripheral sidewall 18 that is thicker in the axial direction than an outer peripheral sidewall 20 of the rupture disk. The annular support portion has a bottom surface 22 and a top surface 24 (shown in FIG. 2). An outer surface 26 of the rupture disk is flush with the bottom surface 22 of the annular support portion. The impervious layer overlies the flushed surfaces of the annular support and rupturable disk portions. The opposite end of the disk assembly includes the annular top surface 24 about a cylindrical recess 28 wherein the recess has a diameter less than a diameter of the rupture disk 14. The disk assembly 10, as shown, is thus a cylinder and the rupturable portion in part forms a radial end face of the cylinder that is thinner in the axial direction than the rest of the cylinder.

In the carbon rupture disk assembly shown in FIGS. 1 and 2, the annular support portion 12 is preferably made from a monoblock plate of metal, plastic, carbon or the like. Preferably, the annular support portion is made from carbon or graphite. More preferably, the annular support portion is made from graphite. In the case where the annular support portion is made from graphite or carbon, the annular support portion may optionally be impregnated with a resin using methods and materials known to those skilled in the art or further comprise a metal casing (not shown) circumferentially disposed about the outer perimeter of the annular support portion. The annular support portion is preferably in the shape of a cylinder with planar top 24 and bottom 22 surfaces. The annular support portion can be optionally coated on its surfaces with a protective coatings such as urethane, urethane acrylate, polytetrafluoroethylene or the like so as to minimize residue buildup during use or contamination to the contained fluid. Other possible shapes and designs of the annular support portion will be apparent to one skilled in the art in view of this disclosure.

To manufacture the carbon disk assembly shown in FIGS. 1 and 2, a monoblock plate of carbon or graphite is formed according to standard practices known to those skilled in the art. Granular graphite or carbon is extruded into cylindrical logs and baked at about 1500° C. in an oven for about 16 weeks. The temperature is increased to about 3000° C. and the logs are graphitized for an additional 10 to 16 weeks. The logs are then cut into the monoblock plates. An exemplary process suitable for use in the present invention is disclosed in a Graphite Anode Processing Flow Sheet, date unknown, by Union Carbide Company, incorporated herein by reference in its entirety.

A bore is drilled through the top surface 24 of the monoblock plate to the bottom surface 22 forming a continuous opening. Preferably the bore is centrally located in the annular support portion and corresponds to an inner diameter of a pipe (not shown) in which the rupture disk assembly is to be fitted. An annular recess 30 is machined about the bore in the bottom surface 22 preferably at a depth corresponding to an axial thickness of the rupture disk 14. Optionally, an adhesive is applied to the disk perimeter surfaces 20 that contact the annular surface and/or the annular recess itself. The rupture disk is inserted into the annular recess and cemented into place. The impervious layer 16 is then disposed on the flushed surfaces 22, and 26 respectively. Preferably, an outer periphery of the layer is cemented to the annular support surface 22 such that the outer periphery is bonded to the surface 22 and overlies the surface 26 of the rupture disk. Optionally, the disk assembly, thus formed, is placed between holding clamps prior to installation in a pressurized passageway as is generally known to those skilled in the art.

The rupture disk 14 consists essentially of carbon. More preferably, the carbon is graphite. The disk, as formed, is not impregnated with resin. Graphite is a higher purity form of carbon and is believed to produce a rupturable disk with a generally tighter burst pressure rating tolerance. The rupture disk consisting essentially of carbon or graphite is less sensitive to temperature changes than conventional impregnated rupture disks from about absolute zero to about 3000° C. The rupture disk is preferably of a shape having a diameter and a thickness corresponding to the shape and depth of the annular recess 30 in the annular support portion 12. One surface 26 of the disk is preferably planar and flush with a surface of the annular support portion whereas the other surface 29 of the disk is of a design suitable for the particular use. Suitable designs adaptable for use in the present invention will be apparent to one of ordinary skill in the art in view of this disclosure and may include a concave surface, or a convex surface design. The disk is positioned in the annular recess 30 and fixedly cemented in place. Preferably, the disk is cemented with a carbonaceous cement formed of a powder mixed with a phenolic or epoxy binder. Thus, the disk assembly so far formed, has the outer surface 26 of the rupture disk flush with one end surface 22 of the annular support portion 12. The opposite end of the disk assembly forms the top annular surface 24 about a cylindrical recess 28 of a diameter less than a diameter of the rupture disk.

The layer 16 overlies the annular support portion 12 and the rupture disk 14 portion. In one embodiment, the layer is generally flat and overlies the flushed surfaces of the annular and the rupturable disk portions to form a fluid tight seal as shown in FIGS. 1 and 2. In another embodiment, the layer is formed into a shape (not shown) and overlies the annular support portion and the rupturable disk portion in a similar fashion to that shown in FIGS. 1 and 2. For example, the layer could be formed into the shape of a cup or hat for use in an inverted rupture disk assembly. Inverted rupture disk assemblies are oriented such that the cylindrical recessed area faces the pressurized surface of interest. The layer would be shaped accordingly to the shape of the cylindrical recess and be disposed on the annular support portion and rupture disk. In either embodiment, the impervious layer is in first contact with the pressurized side of interest to form the fluid tight seal.

The layer 16 can be coated directly onto the appropriate surface of the disk assembly or added as a distinct and separate layer. Preferably, the layer is a distinct and separate element. Preferably, the layer does not increase or decrease the burst pressure of the rupture disk. Preferably, the impervious layer is cemented to the annular support portion such that the layer rests over the rupturable disk portion. It has been found that cementing the layer to the rupture disk may affect burst pressure rating. For example, a 3 mil polytetrafluoroethylene layer fully surface bonded, not coated, as a separate layer to the annular support portion and the rupture disk adds 1 psig of burst pressure strength. Materials for the layer include those materials corrosive resistant to chemicals and generally insensitive to operating temperatures. Preferably, the material used for the impervious layer is easily formed into thin layers. Preferred materials include thin glass, metals, plastics or the like. Suitable metals include tantalum, steel, HASTELLOY®, nickel or the like. Suitable plastics include elastomers such as those sold under the trademark HYPALON® and fluoropolymers such as those sold under the trademark VITON® from Dupont-Dow Companies and thermoplastics such as polyvinylidene fluoride, polytetrafluoroethylene and polyparaphenylene terephthalamide. Other materials suitable for use as a layer in the present invention would be apparent to one skilled in the art in view of this disclosure.

The layer, thus formed, is resistant to most aliphatics, aromatics, alcohols, gases, acids, bases and chlorinated solvents such as chromic acid, hydrofluoric acid, nitric acid, sulfuric acid, aluminum hydroxide, ammonium hydroxide, calcium hydroxide, potassium hydroxide, sodium hydroxide, oleum, ozone, bromine, iodine, calcium chlorate, potassium chlorate, sodium chlorate, calcium hypochlorite, potassium hypochlorite, sodium hypochlorite, fluorine, petroleum, methylene chloride and molten metal alkalis. The layer material can be chosen so that the layer is generally temperature insensitive over the temperature range of use, e.g., nickel is temperature insensitive to 1000° F. The axial thickness of the layer is of a dimension to impart sufficient mechanical strength and suitable for forming the fluid tight seal in the different operating environments for extended periods of time.

Figure 2A:
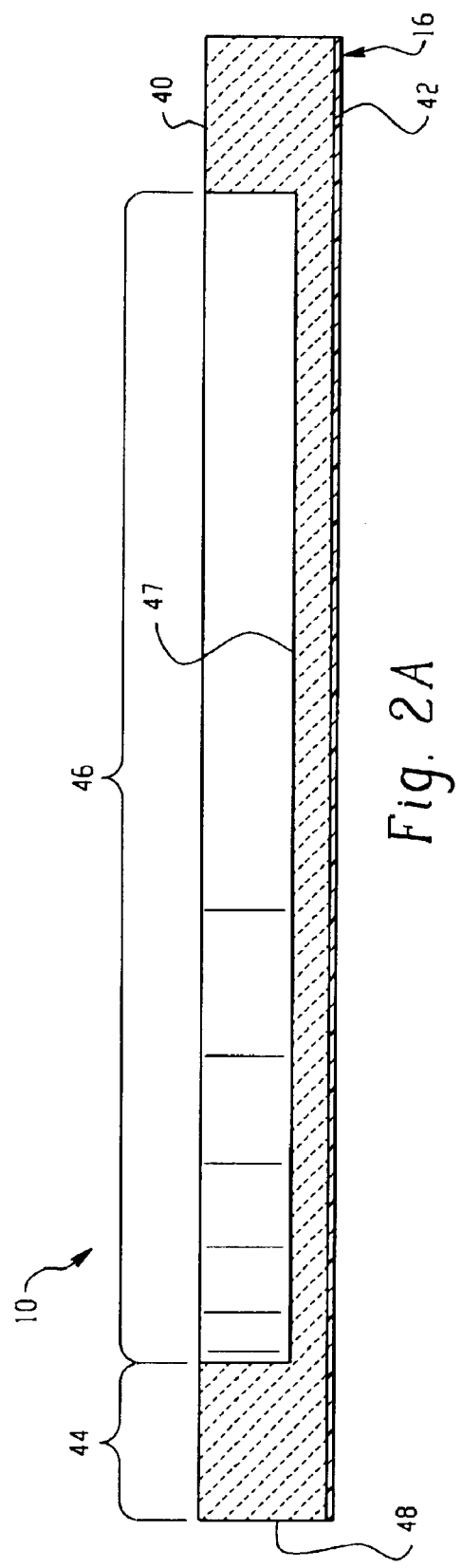
FIG. 2A is a cross-sectional view of a carbon disk assembly in accordance with an alternative embodiment of the invention.

Alternatively, the disk assembly 10 is integrally made from one piece and formed from carbon as shown in FIG. 2A. In this embodiment, a monoblock disk of carbon is used that consists essentially of carbon. The disk is not impregnated with a resin. Preferably, the monoblock disk consists essentially of graphite and is in the shape of a cylinder with top 40 and bottom 42 planar surfaces. A bore is machined partway into one of the surfaces to define an annular support portion 44 and an underlying rupturable disk portion 46 within the disk. The annular support portion 44 of the disk assembly forms an annular base having an outer sidewall 48 that is thicker in the axial direction than the rupturable disk portion. The thickness of the underlying rupturable disk portion resulting from the depth of the bore determines the pressure at which the rupturable disk portion will burst in response to a pressure exceeding the predetermined burst pressure of the rupturable area. Preferably, the bore is centrally located within the disk. It will be appreciated by those skilled in the art in view of this disclosure that a surface 47 defined by the bore can be of a design suitable for the particular use. For example, the surface could be planar as shown in FIG. 2A or of a conical design, a notched design, center raised design or the like. The annular support portion 44 can be optionally coated with a protective coating such as urethane, urethane acrylate and Teflon so as to minimize contamination or particle contribution to the external environment. The rupturable disk portion does not have a protective coating. The disk assembly further includes the impervious layer 16 as described above and is disposed on the bottom planar surface 42. The disk assembly so formed is positioned in a fluid passageway such that the layer 16 is in first contact with the fluid.

Figure 3:
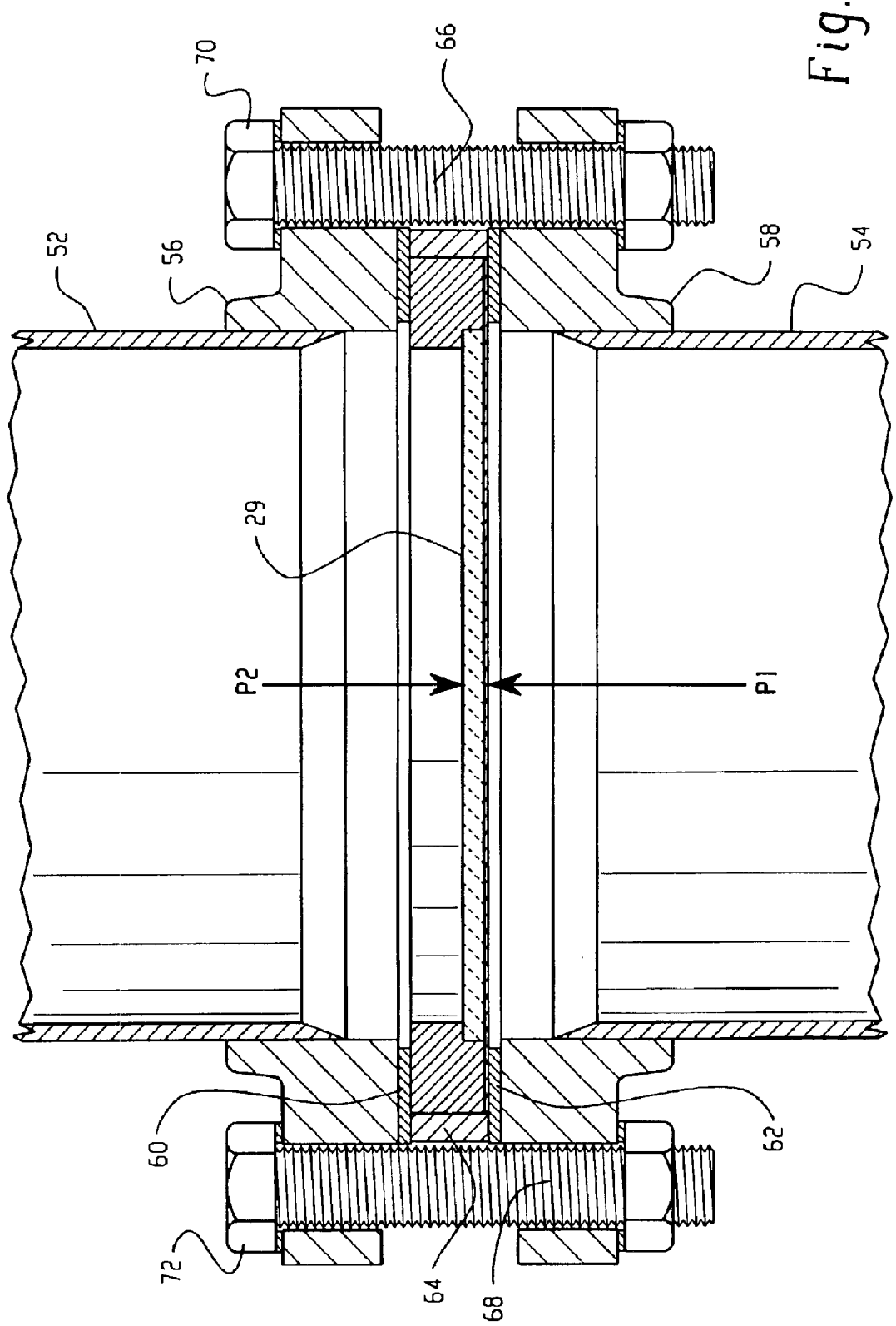
FIG. 3 is a cross-sectional view of the carbon disk assembly of FIG. 2 illustrated in a typical installation.
Figure 4:
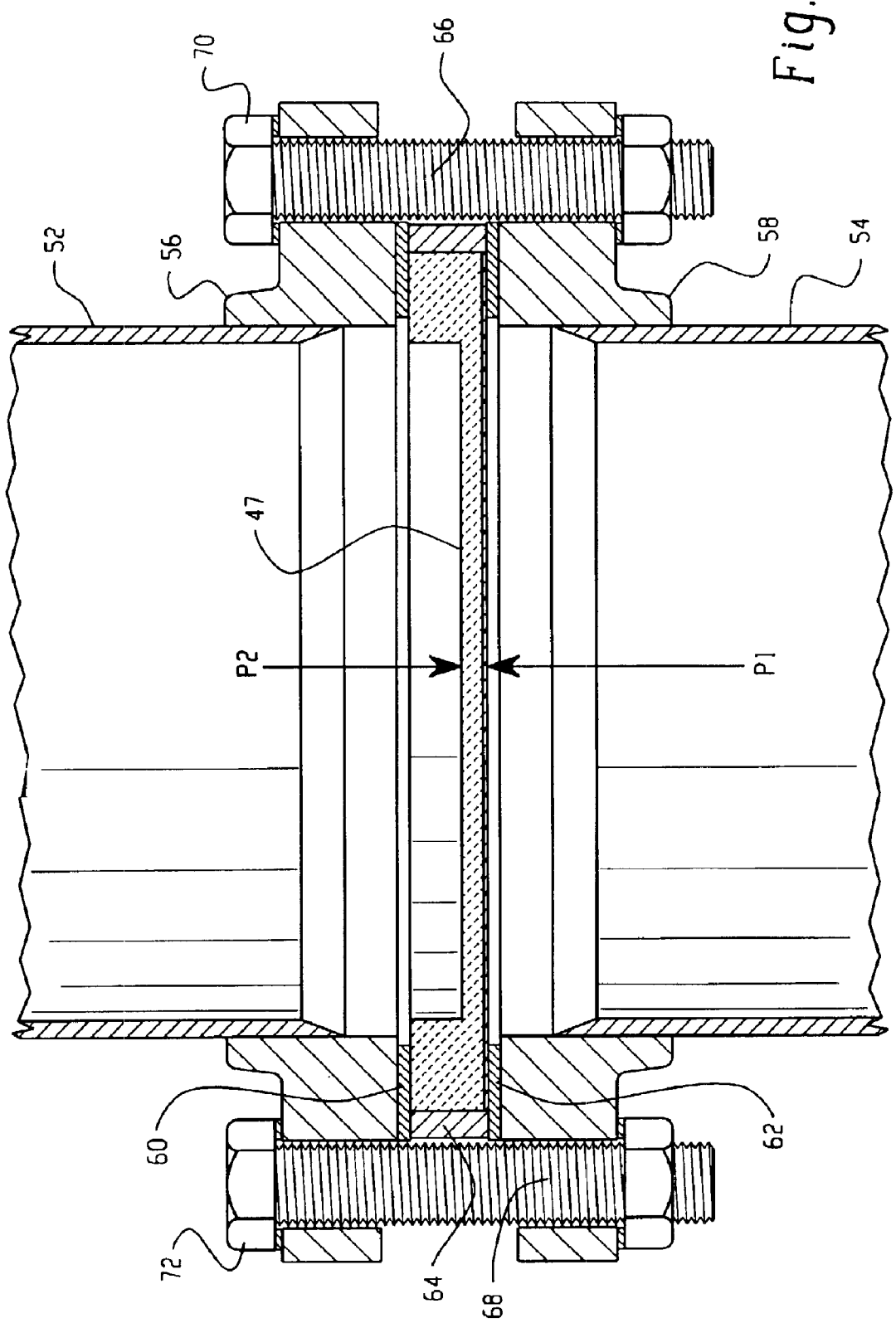
FIG. 4 is a cross-sectional view of the carbon disk assembly of FIG. 2A illustrated in a typical installation.

A metal casing 64 (as shown in FIGS. 3 and 4) is adapted to fit about the outer circumference of the inventive disk assemblies. The casing is a cylinder integral with and substantially the same axial dimension as the annular support portion. The casing prevents extraneous stresses as well as unequal flange bolting stresses from reaching the rupturable portion of the disk assembly, thereby effecting disk integrity. A coating of urethane, urethane acrylate or polytetrafluoroethylene or any other suitable material can be applied to the annular support portion of the disk assembly to prevent build up on the disk during use and contamination to the external environment.

The rupture disk assemblies shown in FIGS. 1, 2 and 2A are designed to be installed in conventional pressure or vacuum relief conduits of pressurized systems. By way of example in FIGS. 3 and 4, a multi-part vent pipe assembly is shown. FIG. 3 depicts the carbon disk assembly shown in FIG. 2. FIG. 4 depicts the carbon disk assembly shown in FIG. 2A. Those skilled in the art will appreciate that the carbon disk assemblies as shown could be easily modified for use in inverted disk assemblies. Upper 52 and lower 54 pipe sections, respectively, of the vent pipe have adjacent facing flanges 56, 58 spaced to receive the rupture disk assembly 10 and gaskets 60, 62. The disk assembly is shown with an outer casing 64. The flanged portions include apertures for accepting fastening bolts 70, 72. The pipe flanges are spaced apart so that the rupture disk assembly and gaskets can be secured therebetween. The first section 54 of vent pipe constitutes a portion of the pressurized/vacuumed system whereas the second section 52 constitutes a relief conduit leading to the open atmosphere or to a safety overflow system.

The rupture disk assembly is factory assembled prior to installation. When received by the customer for installation, the rupture disk assembly comprises the disk assembly 10 and gaskets 60, 62. To install the carbon disk assembly, gasket 60 is placed on the top annular support surface, 24 or 44, of the disk assembly 10 and gasket 62 is placed on the bottom-most surface of the disk assembly. Thus, gasket 62 is placed on the layer 16. The disk assembly with the gaskets attached thereto are placed between the pipe flanges 56, 58. The disk assembly 10 as assembled thus far, should be oriented so that the layer 16 first faces the pressurized/vacuumed system of the first vent pipe section 54 resulting in the layer being in first contact with the fluid during operation. Thus, when properly installed, the annular support portion 18 or 44 of the disk assembly 10 with the gasket 60 attached thereto, will be secured against the flange 56 of the relief conduit portion 52 of the vent pipe. When in place, the flanges of the pipes are tightened toward each other by bolts 70, 72, thereby sandwiching the disk assembly 10 and gaskets 60, 62 in a fluid tight relationship.

In any of the embodiments shown, the rupture disk 14 or rupturable disk portion 46 of the rupture disk assembly is subjected to a pressure $P_1$ from fluid in the containment vessel. The carbon disk assembly is oriented such that the impervious layer first faces $P_1$. The impervious layer acts as a barrier and forms the fluid tight seal. The upper surface 29 of the rupture disk 14 or upper surface 47 of the rupturable disk portion 46, respectively, is subjected to a pressure $P_2$, which is normally, but not necessarily, atmospheric pressure. When the pressure $P_1$ exceeds a burst strength of the rupturable disk portion, the disk will rupture releasing the pressure into the vent pipe having the $P_2$ pressure. An input electrode may be affixed to the rupture disk assembly near the center of the disk for monitoring the condition of the rupturable disk portion and is described in detail in U.S. Pat. No. 5,313,194, to Santos et al., incorporated herein by reference in their entirety.

By way of example, a nominal 10.16 cm (4") graphite rupturable disk assembly rated to burst at a pressure of 2.76 bar (40 psig) was prepared according to one of the embodiments. The outside diameter of the graphite disk was 14.61 cm (5.75"). Surrounding the outer circumferential surface of the graphite disk was a steel casing having a diameter of 17.15 cm (6.75"). The steel casing was secured to the graphite disk by carbonaceous cement formed of a carbonaceous powder mixed with a phenolic or epoxy resin binder. The pressure sensitive disk has an axial thickness of approximately 0.44 cm (0.17") and a diameter of 10.2 cm (4.0"). The annular support portion had an axial thickness of approximately 2.2 cm (0.875"). A polytetrafluoroethylene layer having a diameter of 17.15 cm (6.75"), similar in diameter to the steel casing, overlaid the annular support portion and graphite rupture disk. The layer was bonded with a pressure sensitive adhesive to the outer periphery of the annular support portion so that the layer rested over the rupturable disk portion. The disk assembly was sandwiched between two gaskets. The gaskets had a pressure sensitive adhesive on one side. The outer diameter of each gasket was substantially identical and approximately 17.1 cm (6.75"). The annular surface gaskets had an axial thickness of about 0.3 cm (0.12") while the disk surface gaskets each had an axial thickness of about 0.15 cm (0.06"). This particular assembly was for installation between standard 4" size class 150 ANSI pipe flanges and was designed to burst at 2.76 bar (40 psig).

Alternative Embodiment

Referring now to FIGS. 5 and 6, yet another alternative embodiment is illustrated. Specifically, FIG. 5 is a cross-sectional view of a carbon disk assembly 110 illustrated in accordance with one embodiment of the present invention. This embodiment is especially beneficial to applications requiring a tight burst tolerance over a wide temperature application range.

The assembly 110 includes a single one-piece block 140. The block is a cylindrical shaped disk and is constructed of essentially graphite. The disk is not impregnated with resin or any other material. The disk has a bottom surface 142 that is planar. The disk assembly 110 is designed so that when properly installed in an application environment, the planar bottom surface 142 will face a pressurized source.

The block 140 has a top surface 147. As shown, a single bore is machined to extend partway into the top portion of the block 140. The bore creates a cavity defined by a sidewall 170 that is relatively perpendicular to the top surface 147. The bore forms an integral rupturable portion 146 and an annular support portion 144. The axial thickness of the integral rupturable portion 146 is less than an axial thickness of the annular support portion 144.

A layer 116 is illustrated overlying the planar bottom surface 142. As shown, the layer 116 is a separate and distinct metallic layer. Preferably, the layer does not increase or decrease the burst pressure of the rupture disk. The layer may be impervious, although it is not required in the practice of the present invention. Preferred materials for the layer include those materials corrosive resistant to chemicals and generally insensitive to operating temperatures. Suitable metals include tantalum, steel, of nickel for example. Other metals suitable for use as a layer in the present invention would be apparent to one skilled in the art in view of this disclosure.

A metal casing 164 is adapted to fit about the outer circumference of the block 140. The casing 164 is a cylinder integral with and having substantially the same axial dimension as the annular support portion 144. The casing 164 as illustrated is made from a section of steel piping. The casing 164 prevents extraneous stresses as well as unequal flange bolting stresses from reaching the rupturable portion 146 of the disk assembly 110, thereby effecting disk integrity. The casing 164 is especially effective when the disk assembly 110 is installed in an application that has an extreme temperature environment. Further, the casing 164 is beneficial to prevent pressurized fluid from escaping laterally from the system after the rupturable portion 146 of the disk has burst.

Referring now to FIG. 6, a cross-sectional view of the carbon disk assembly 110 of FIG. 5 is illustrated in a typical installation. The disk assembly 110 is specifically designed to properly function in application environment where the temperatures vary over a large range.

A conventional multi-part vent pipe assembly 200 is shown. An upstream pipe section 154 and a downstream pipe section 152 of the vent pipe have adjacent facing flanges 156, 158 spaced to receive the rupture disk assembly 110 and gaskets 160, 162. The flanged portions include apertures for accepting fastening bolts 170, 172. The pipe flanges are spaced apart so that the rupture disk assembly and gaskets can be secured therebetween. The first section 154 of vent pipe constitutes a portion of the pressurized/vacuumed system having a pressure $P_1$ and the second section 152 constitutes a relief conduit leading to a safety overflow system having an atmospheric pressure of $P_2$. Whenever the pressure $P_1$ exceeds the burst rating of the disk assembly 110, the disk is designed to burst toward the downstream lower pipe section 152.

The disk assembly 110 as shown in FIG. 5 and described above features a particular burst pressure that is generally temperature insensitive over essentially the entire said temperature operational range. In tests conducted by the applicant, the disk assembly of the embodiment illustrated in FIG. 5 designed to rupture at 100 psi at 72° F. (22° C.) has ruptured within a +/−5% tolerance of 100 psi at temperature ranges from about −425° F. (−254° C.) to about 900° F. (482° C.). Based on these results, it is further believed that this disk assembly will rupture within a +/−5% tolerance of 100 psi at temperature ranges up to at least as high as 5432° F. (3000° C.). As discussed above, 3000° C. is believed to be the present temperature stability limit of carbon and unimpregnated graphite. Other conventional rupture disks are not known to perform to this tolerance over this temperature range, or any other substantial temperature range. For example, impregnated graphite does not permit consistent burst tolerances at elevated and reduced temperatures. Other proposed rupture disks are simply not designed for environments having temperatures above 212° F.

The foregoing description of the preferred embodiments of the invention has been presented for purposes of illustration and description. It is not intended to be exhaustive or to limit the invention to the precise forms disclosed. Obvious modifications or variations are possible in light of the above teachings. For example, the inventive carbon rupture disk assemblies can be assembled as mono disk assembly, inverted disk assembly, two way disk assembly, insulated disk assembly or the like. The embodiments were chosen and described to provide the best illustration of the principles of the invention and its practical applications to thereby enable one of ordinary skill in the art to utilize the invention in various embodiments and with various modifications as are suited to the particular use contemplated.

All such modifications and variations are within the scope of the invention as determined by the appended claims when interpreted in accordance with the breadth to which they are fairly, legally and equitably entitled.

What is claimed is:

1. A rupture disk assembly for use in a pressurized fluid passageway within an application environment having a temperature operational range, said disk assembly comprising:
    a) a cylindrical one-piece disk consisting essentially of unimpregnated graphite having a top surface and a planar bottom surface, wherein said bottom surface faces a pressurized source;
    b) a single bore extending partway into said top surface of the disk forming an integral rupturable portion and an annular support portion wherein an axial thickness of said integral rupturable portion is less than an axial thickness of said annular support portion;
    c) a casing circumferentially disposed about said disk; and
    d) a metallic layer overlying said planar bottom surface of said disk;
    e) wherein said disk assembly has a particular burst pressure that is generally temperature insensitive over essentially the entire said temperature operational range;
    f) wherein said burst pressure has a tolerance of about +/−5% over essentially the entire said temperature operational range.

2. The rupture disk assembly of claim 1 wherein said burst pressure is generally temperature insensitive over said temperature operational range, wherein said range is from about −425° F. to about 900° F.

3. The rupture disk assembly of claim 1 wherein said burst pressure has a tolerance of about +/−5% over essentially the entire said temperature operational range, wherein said range is from about −425° F. to about 900° F.

4. The rupture disk assembly of claim 1 wherein a bottom limit of said temperature operational range is about −390° F.

5. The rupture disk assembly of claim 1 wherein a top limit of said temperature operational range is about 1000° F.

6. The rupture disk assembly of claim 1 wherein a top limit of said temperature operational range is at least as high as 5432° F.

7. The rupture disk assembly of claim 1 wherein said layer is a metal selected from the group consisting of nickel, monel, inconel, tantalum, steel and hastelloy.

8. The rupture disk assembly of claim 1 wherein said layer is generally temperature insensitive below about 1000° F.

9. The rupture disk assembly of claim 1 wherein said casing is a section of metal pipe.

* * * * *